(12) United States Patent  (10) Patent No.: US 8,904,867 B2
Martin et al.  (45) Date of Patent: Dec. 9, 2014

(54) DISPLAY-INTEGRATED OPTICAL ACCELEROMETER

(75) Inventors: Russel A. Martin, Menlo Park, CA (US); Manish Kothari, Cupertino, CA (US); Evgeni P. Gousev, Saratoga, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 878 days.

(21) Appl. No.: 12/939,966

(22) Filed: Nov. 4, 2010

(65) Prior Publication Data

US 2012/0116709 A1  May 10, 2012

(51) Int. Cl.
*G01P 15/093* (2006.01)
*G01P 15/08* (2006.01)
*G06F 3/03* (2006.01)
*G02B 26/00* (2006.01)
*G09G 3/34* (2006.01)

(52) U.S. Cl.
CPC ............ *G01P 15/093* (2013.01); *G09G 3/3466* (2013.01); *G06F 3/0317* (2013.01); *G02B 26/001* (2013.01)
USPC ...................................................... 73/514.26

(58) Field of Classification Search
USPC .......................... 73/514.26, 514.27, 653, 657
See application file for complete search history.

(56) References Cited

U.S. PATENT DOCUMENTS

| | | | |
|---|---|---|---|
| 3,789,674 A * | 2/1974 | Anderson et al. .......... | 73/514.26 |
| 3,961,185 A * | 6/1976 | Brokenshire et al. ...... | 250/231.1 |
| 4,083,254 A * | 4/1978 | Nissl .......................... | 73/514.26 |
| 4,441,791 A | 4/1984 | Hornbeck | |
| 4,493,212 A * | 1/1985 | Nelson ............................. | 73/800 |
| 4,567,771 A * | 2/1986 | Nelson et al. .................... | 73/653 |
| 4,571,603 A | 2/1986 | Hornbeck et al. | |
| 4,748,366 A | 5/1988 | Taylor | |
| 4,822,999 A * | 4/1989 | Parr ........................... | 250/206.1 |
| 4,859,060 A | 8/1989 | Katagiri et al. | |
| 4,860,586 A * | 8/1989 | Miers et al. ................ | 73/514.26 |
| 4,954,789 A | 9/1990 | Sampsell | |
| 5,083,857 A | 1/1992 | Hornbeck | |

(Continued)

FOREIGN PATENT DOCUMENTS

| | | |
|---|---|---|
| DE | 26 24 884 | 12/1977 |
| EP | 0 571 107 | 11/1993 |

(Continued)

OTHER PUBLICATIONS

ISR and WO dated Feb. 1, 2012 in PCT/US11/058413.

(Continued)

*Primary Examiner* — Helen Kwok
(74) *Attorney, Agent, or Firm* — Knobbe Martens Olson & Bear LLP

(57) ABSTRACT

An optical accelerometer and method of determining an acceleration are disclosed. In one aspect, an accelerometer includes a light source, a substrate, a light guide attached to a first side of the substrate and configured to redirect light from the light source through the substrate. The accelerometer also includes a light detector, a proof mass attached to a second side of the substrate via one or more springs, wherein the second side is opposite the first side and wherein motion of the proof mass alters a characteristic of the light from the light source reaching the light detector, and a processor configured to determine an acceleration based on the characteristic of the light reaching the light detector.

23 Claims, 14 Drawing Sheets

(56) References Cited

U.S. PATENT DOCUMENTS

| | | | |
|---|---|---|---|
| 5,216,537 A | 6/1993 | Hornbeck | |
| 5,226,099 A | 7/1993 | Mignardi et al. | |
| 5,276,322 A * | 1/1994 | Carome | 250/227.21 |
| 5,437,186 A * | 8/1995 | Tschulena | 73/514.26 |
| 5,489,952 A | 2/1996 | Gove et al. | |
| 5,526,172 A | 6/1996 | Kanack | |
| 5,530,240 A | 6/1996 | Larson et al. | |
| 5,550,373 A | 8/1996 | Cole et al. | |
| 5,551,293 A | 9/1996 | Boysel et al. | |
| 5,629,521 A | 5/1997 | Lee et al. | |
| 5,815,141 A | 9/1998 | Phares | |
| 5,848,206 A * | 12/1998 | Labeye et al. | 385/22 |
| 5,894,686 A | 4/1999 | Parker et al. | |
| 5,926,591 A * | 7/1999 | Labeye et al. | 385/25 |
| 5,977,945 A | 11/1999 | Ohshima | |
| 6,014,121 A | 1/2000 | Aratani et al. | |
| 6,018,390 A * | 1/2000 | Youmans et al. | 356/477 |
| 6,040,937 A | 3/2000 | Miles | |
| 6,263,733 B1 * | 7/2001 | Reimer et al. | 73/514.26 |
| 6,295,048 B1 | 9/2001 | Ward et al. | |
| 6,304,297 B1 | 10/2001 | Swan | |
| 6,307,194 B1 | 10/2001 | Fitzgibbons et al. | |
| 6,350,983 B1 * | 2/2002 | Kaldor et al. | 250/231.1 |
| 6,377,718 B1 | 4/2002 | Que et al. | |
| 6,525,307 B1 * | 2/2003 | Evans et al. | 250/227.16 |
| 6,666,561 B1 | 12/2003 | Blakley | |
| 6,674,562 B1 | 1/2004 | Miles et al. | |
| 6,737,979 B1 | 5/2004 | Smith et al. | |
| 6,763,718 B1 * | 7/2004 | Waters et al. | 73/514.26 |
| 6,819,469 B1 | 11/2004 | Koba | |
| 6,829,132 B2 | 12/2004 | Martin et al. | |
| 6,886,404 B2 * | 5/2005 | Digonnet et al. | 73/514.27 |
| 6,904,805 B2 * | 6/2005 | Joseph et al. | 73/514.38 |
| 6,921,894 B2 * | 7/2005 | Swierkowski | 250/227.21 |
| 6,998,599 B2 * | 2/2006 | Lagakos et al. | 250/227.16 |
| 7,091,715 B2 * | 8/2006 | Nemirovsky et al. | 73/514.26 |
| 7,123,216 B1 | 10/2006 | Miles | |
| 7,138,984 B1 | 11/2006 | Miles | |
| 7,280,265 B2 | 10/2007 | Miles | |
| 7,327,510 B2 | 2/2008 | Cummings et al. | |
| 7,369,294 B2 | 5/2008 | Gally et al. | |
| 7,460,246 B2 | 12/2008 | Kothari | |
| 7,516,659 B2 * | 4/2009 | Murelitharan | 73/514.01 |
| 7,535,466 B2 | 5/2009 | Sampsell et al. | |
| 7,583,390 B2 * | 9/2009 | Carr | 356/519 |
| 7,586,484 B2 | 9/2009 | Sampsell et al. | |
| 7,595,926 B2 | 9/2009 | Sasagawa et al. | |
| 7,653,371 B2 | 1/2010 | Floyd | |
| 7,657,242 B2 | 2/2010 | Floyd | |
| 7,660,028 B2 | 2/2010 | Lan | |
| 7,684,051 B2 * | 3/2010 | Berthold et al. | 356/519 |
| 7,743,661 B2 * | 6/2010 | Berthold et al. | 73/653 |
| 7,787,130 B2 | 8/2010 | Webster | |
| 7,787,171 B2 | 8/2010 | Webster | |
| 7,808,703 B2 | 10/2010 | Gally et al. | |
| 7,852,483 B2 | 12/2010 | Kothari | |
| 7,852,491 B2 | 12/2010 | Webster | |
| 7,860,668 B2 | 12/2010 | Khazeni | |
| 7,881,686 B2 | 2/2011 | Floyd | |
| 7,892,839 B2 * | 2/2011 | Gueissaz et al. | 436/3 |
| 7,903,047 B2 | 3/2011 | Cummings | |
| 7,920,135 B2 | 4/2011 | Sampsell et al. | |
| 7,929,196 B2 | 4/2011 | Gally et al. | |
| 8,026,714 B2 * | 9/2011 | Carr | 324/162 |
| 8,154,734 B2 * | 4/2012 | Carr et al. | 356/519 |
| 8,334,984 B2 * | 12/2012 | Perez et al. | 356/519 |
| 2002/0075555 A1 | 6/2002 | Miles | |
| 2003/0112507 A1 | 6/2003 | Divelbiss et al. | |
| 2003/0117382 A1 | 6/2003 | Pawlowski et al. | |
| 2003/0128197 A1 | 7/2003 | Turner et al. | |
| 2003/0206693 A1 | 11/2003 | Tapalian et al. | |
| 2004/0024580 A1 | 2/2004 | Salmonsen et al. | |
| 2004/0060355 A1 | 4/2004 | Nemirovsky et al. | |
| 2004/0149037 A1 | 8/2004 | Digonnet et al. | |
| 2005/0001797 A1 | 1/2005 | Miller et al. | |
| 2005/0068254 A1 | 3/2005 | Booth | |
| 2006/0066596 A1 | 3/2006 | Sampsell et al. | |
| 2006/0176241 A1 | 8/2006 | Sampsell | |
| 2007/0023851 A1 | 2/2007 | Hartzell et al. | |
| 2007/0200839 A1 | 8/2007 | Sampsell | |
| 2007/0247406 A1 | 10/2007 | Zhou et al. | |
| 2008/0112031 A1 | 5/2008 | Gally et al. | |
| 2008/0163686 A1 * | 7/2008 | Carr | 73/514.26 |
| 2008/0174781 A1 * | 7/2008 | Berthold et al. | 356/477 |
| 2009/0207473 A1 | 8/2009 | Bita et al. | |
| 2009/0244679 A1 | 10/2009 | Khazeni | |
| 2009/0267869 A1 | 10/2009 | Gally et al. | |
| 2009/0267953 A1 | 10/2009 | Sampsell et al. | |
| 2009/0308158 A1 * | 12/2009 | Bard | 73/514.26 |
| 2009/0308452 A1 | 12/2009 | Sasagawa et al. | |
| 2010/0117761 A1 | 5/2010 | Floyd | |
| 2010/0123706 A1 | 5/2010 | Lan | |
| 2010/0220248 A1 | 9/2010 | Miles | |
| 2011/0071775 A1 | 3/2011 | Khazeni | |
| 2011/0085278 A1 | 4/2011 | Floyd | |
| 2011/0102800 A1 | 5/2011 | Bita | |
| 2011/0115690 A1 | 5/2011 | Cummings | |
| 2011/0148828 A1 | 6/2011 | Sampsell et al. | |
| 2011/0176196 A1 | 7/2011 | Govil et al. | |
| 2012/0024062 A1 * | 2/2012 | Tiefel et al. | 73/514.26 |

FOREIGN PATENT DOCUMENTS

| | | |
|---|---|---|
| EP | 0 649 010 | 4/1995 |
| EP | 0 725 380 | 8/1996 |
| EP | 1 083 429 A2 | 3/2001 |
| JP | 11-142427 | 5/1999 |
| JP | 2003107104 A | 4/2003 |
| WO | WO 2004/066256 | 8/2004 |
| WO | WO 2005/066596 | 7/2005 |

OTHER PUBLICATIONS

Brank et al., Sep. 2001, RF MEMS-based tunable filters, International Journal of RF and Microwave Computer-Aided Engineering, 11(5):276-284.

Miles, A New Reflective FPD Technology Using Interferometric Modulation, Journal of the SID 5/4, 1997, pp. 379-382.

Miles, "MEMS-based interferometric modulator for display applications," Proceedings of SPIE, vol. 3876, Aug. 1999, pp. 20-281.

Miles et al., 10.1: Digital Paper™ for reflective displays, SID 02 Digest, pp. 115-117, 2002.

Winton, John M., A novel way to capture solar energy, Chemical Week, pp. 17-18 (May 15, 1985).

Wu, Design of a Reflective Color LCD Using Optical Interference Reflectors, ASIA Display '95, pp. 929-931 (Oct. 16, 1995).

* cited by examiner

Common Voltages

| | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

Segment Voltages

DISPLAY-INTEGRATED OPTICAL ACCELEROMETER

TECHNICAL FIELD

This disclosure relates to displays and accelerometers.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a metallic membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

SUMMARY

The systems, methods and devices of the disclosure each have several innovative aspects, no single one of which is solely responsible for the desirable attributes disclosed herein.

One innovative aspect of the subject matter described in this disclosure can be implemented in an accelerometer including a light source, a substrate, a light guide attached to a first side of the substrate and configured to redirect light from the light source through the substrate. The accelerometer also includes a light detector and a proof mass attached to a second side of the substrate via one or more springs, wherein the second side is opposite the first side and wherein motion of the proof mass alters a characteristic of the light from the light source reaching the light detector In some implementations, the accelerometer can include a processor configured to determine an acceleration based on the characteristic of the light reaching the light detector. In some implementations, the accelerometer can include a backside light guide that can be deposited on the substrate opposite the light guide and configured to redirect light back through the substrate. In some implementations, the characteristic of the light can be an intensity of the light. In some other implementations, the characteristic of the light can be a polarization or a wavelength. In some implementations, the one or more springs can include two springs with different spring constants.

In another aspect, a method of determining an acceleration includes directing light through a substrate towards a proof mass and determining an acceleration based on a characteristic of the light.

In some implementations, the characteristic of the light can be an intensity of the light. In some other implementations, the characteristic of the light can be a polarization or a wavelength. In some implementations, motion of the proof mass can alter the characteristic of the light. In some implementations, the characteristic of the light can be determined, e.g., by a detector.

In another aspect, an accelerometer includes means for directing light through a substrate towards a proof mass and means for determining an acceleration based on a characteristic of the light.

In some implementations, the accelerometer can also include means for generating light and means for determining the characteristic of the light. In some implementations, the means for generating light can include a light source, the means for directing light can include a light guide, the means for determining the characteristic can include can include light detector, and the means for determining an acceleration can include a processor.

In another aspect, a method of manufacturing a display device includes providing a substrate, positioning a light source and a light detector proximal to the substrate, depositing or etching a light guide onto a first side of the substrate, wherein the light guide is configured to redirected light from the light source through the substrate, and forming a proof mass attached to a second side of the substrate via one or more springs, wherein the second side is opposite the first side and wherein motion of the proof mass alters a characteristic of the light from the light source reaching the light detector.

In some implementations, the method can include configuring a processor to determine an acceleration based on the characteristic of the light reaching the light detector. In some implementations, forming a proof mass attached to a second side of the substrate can include etching, deposition, or lithography.

In another aspect, an accelerometer includes an optical element attached to a support via at least two springs with different spring constants and configured to generate or reflect light and a light detector configured to determine an intensity of the light.

In some implementations, the accelerometer includes a processor configured to determine an acceleration based on the determined intensity.

In some implementations, the optical element can include a light source. In some other implementations, the optical element can include a mirror. In some implementations, the at least two springs includes at least two springs with different spring constants attached to opposite sides of the optical element.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
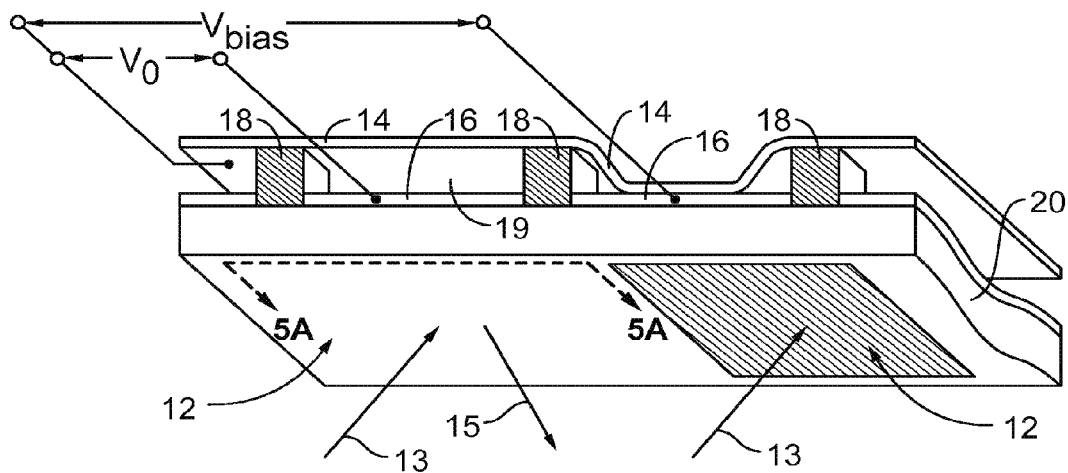
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, electronic test equipment. Thus, the teachings are not intended to be limited to the implementations depicted solely in the Figures, but instead have wide applicability as will be readily apparent to one having ordinary skill in the art.

An array of interferometric modulators (IMODs) can be used as the screen of an electronic device to display information. IMODs are specular display elements, in that they do not produce their own light, but rather reflect, transmit, or absorb incident light. Thus, the electronic device can include an illumination system to illuminate the IMOD array in dim and/or dark conditions. The illumination system can include a light source and one or more light redirectors, including mirrors and lenses, which redirect the light from the source to the IMOD array.

The electronic device also can include a light source and a light detector as part of an optical touch detection system so as to provide touchscreen functionality. The optical touch detection system can include a light source, a light guide which guides the light along the viewing surface of the display, and a light detector to detect whether the light has propagated across the display or been occluded by, e.g., a user's touch.

The electronic device also may include an accelerometer. An accelerometer, for example, can be used as an input device to allow, e.g., a user to control the electronic device by moving it. Generally, an accelerometer functions to determine acceleration by detecting the motion of a proof mass. In some implementations, the proof mass is located opposite the viewing surface of a display and motion of the proof mass is detected optically. A light source and light detector of an optical touch detection system can be used to determine the motion of the proof mass. Thus, light propagating from the light source across the viewing surface of the display can be redirected through the display to the proof mass and back through the display to the viewing surface where it propagates across the rest of the display (unless occluded by, e.g., a user).

Particular implementations of the subject matter described in this disclosure can be implemented to realize one or more of the following potential advantages. In some implementations, the light sources and light detectors of an optical touch detection system of an electronic device can additionally be used as part of the accelerometer. This can reduce the number of parts needed in the electronic device, thereby reducing weight and cost. The structure of the accelerometer, including, for example, a proof mass or a light redirecting film, can be manufacturer simultaneously with other parts of a display device using, for example, etching, deposition, or lithography, as described below. This can reduce the number of manufacturing steps needed to make the device, thereby reducing time and cost.

One example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by one having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be on the order of 1-1000 um, while the gap 19 may be on the order of <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14a remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
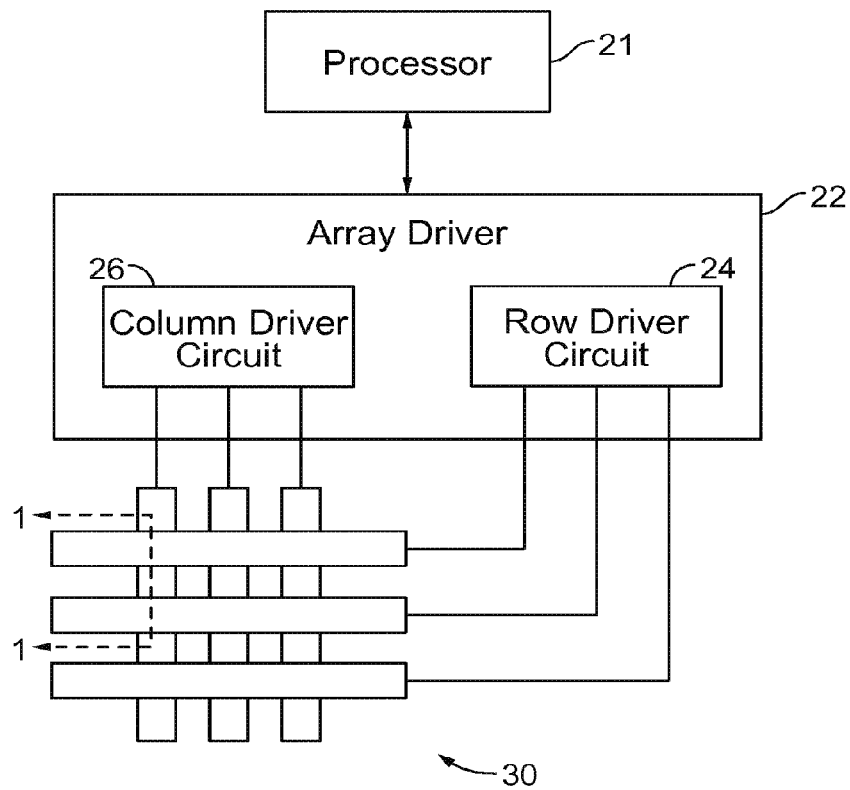
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3A, 3B:
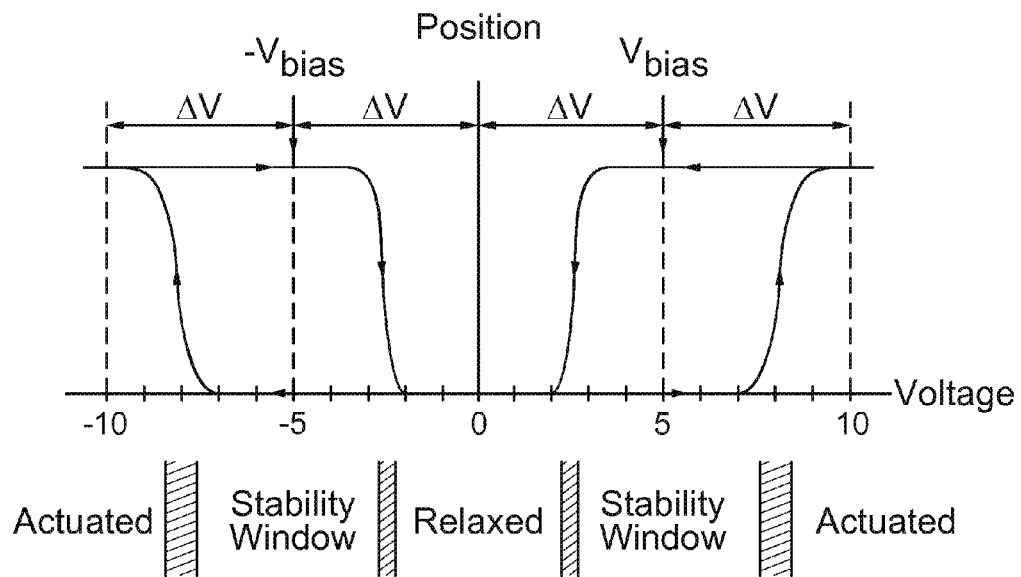
FIG. 3A shows an example of a diagram illustrating movable reflective layer position versus applied voltage for the interferometric modulator of FIG. 1.
FIG. 3B shows an example of a table illustrating various states of an interferometric modulator when various common and segment voltages are applied.

FIG. 3A shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3A. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3A, exists where there is a window of applied voltage within which the device is stable in either the relaxed or actuated state. This is referred to herein as the "hysteresis window" or "stability window." For a display array 30 having the hysteresis characteristics of FIG. 3A, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 3B shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 3B (as well as in the timing diagram shown in FIG. 4B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3A, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 4A:
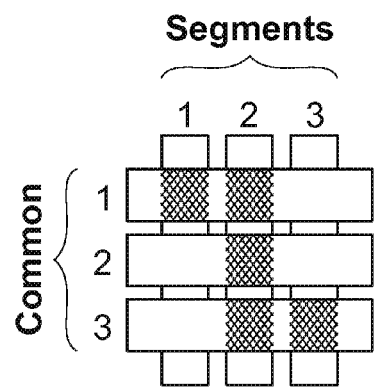
FIG. 4A shows an example of a diagram illustrating a frame of display data in the 3×3 interferometric modulator display of FIG. 2.
Figure 4B:
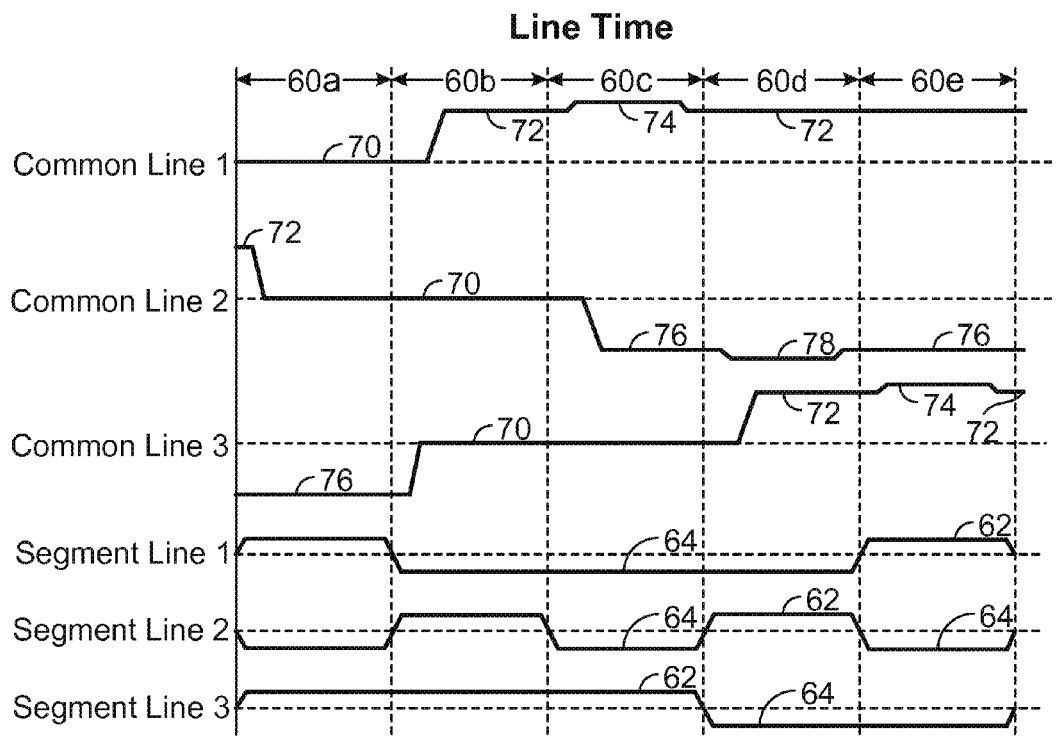
FIG. 4B shows an example of a timing diagram for common and segment signals that may be used to write the frame of display data illustrated in FIG. 4A.

FIG. 4A shows an example of a diagram illustrating a frame of display data in the 3×3 interferometric modulator display of FIG. 2. FIG. 4B shows an example of a timing diagram for common and segment signals that may be used to write the frame of display data illustrated in FIG. 4A. The signals can be applied to the, e.g., 3×3 array of FIG. 2, which will ultimately result in the line time 60e display arrangement illustrated in FIG. 4A. The actuated modulators in FIG. 4A are in a dark-state, i.e., where a substantial portion of the reflected light is outside of the visible spectrum so as to result in a dark appearance to, e.g., a viewer. Prior to writing the frame illustrated in FIG. 4A, the pixels can be in any state, but the write procedure illustrated in the timing diagram of FIG. 4B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 3B, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 4A, and will remain in that state as long as the hold voltages are applied along the common lines, regardless of variations in the segment voltage which may occur when modulators along other common lines (not shown) are being addressed.

In the timing diagram of FIG. 4B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 4B. In some other implementations, voltages applied along common lines or segment lines may vary to account for variations in the actuation and release voltages of different modulators, such as modulators of different colors.

Figure 5A:
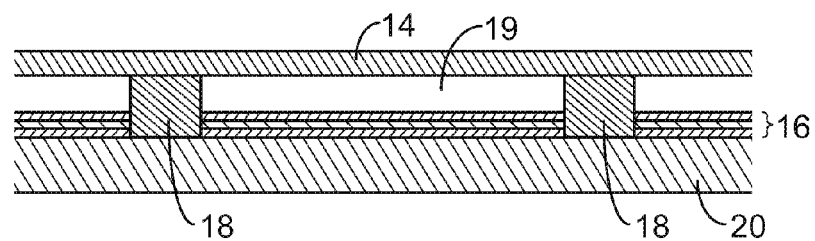
FIG. 5A shows an example of a partial cross-section of the interferometric modulator display of FIG. 1.
Figure 5B:
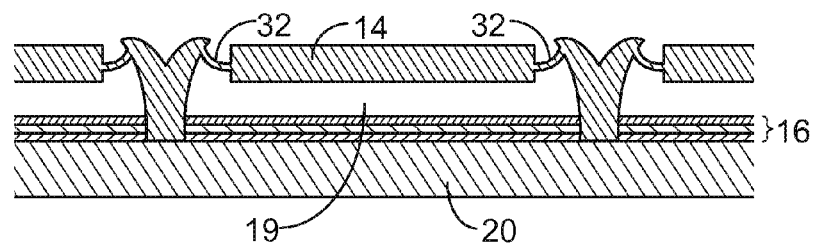
FIGS. 5B-5E show examples of cross-sections of varying implementations of interferometric modulators.
Figure 5C:
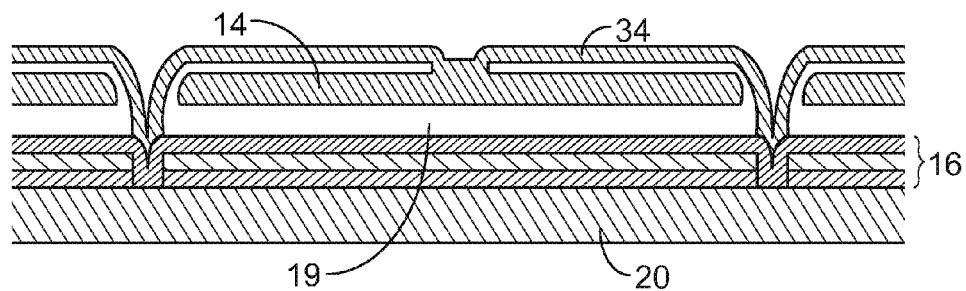

The details of the structure of interferometric modulators that operate in accordance with the principles set forth above may vary widely. For example, FIGS. 5A-5E show examples of cross-sections of varying implementations of interferometric modulators, including the movable reflective layer 14 and its supporting structures. FIG. 5A shows an example of a partial cross-section of the interferometric modulator display of FIG. 1, where a strip of metal material, i.e., the movable reflective layer 14 is deposited on supports 18 extending orthogonally from the substrate 20. In FIG. 5B, the movable reflective layer 14 of each IMOD is generally square or rectangular in shape and attached to supports at or near the corners, on tethers 32. In FIG. 5C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 5C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 5D:
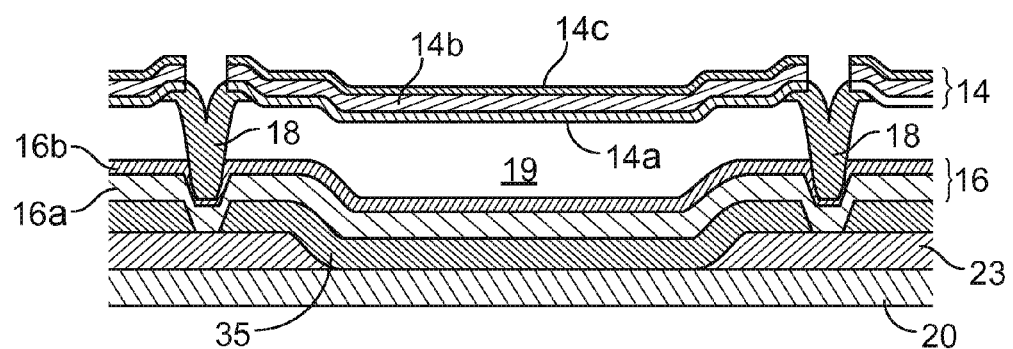

FIG. 5D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an Al alloy with about 0.5% Cu, or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 5D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, $CF_4$ and/or $O_2$ for the MoCr and $SiO_2$ layers and $Cl_2$ and/or $BCl_3$ for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 5E:
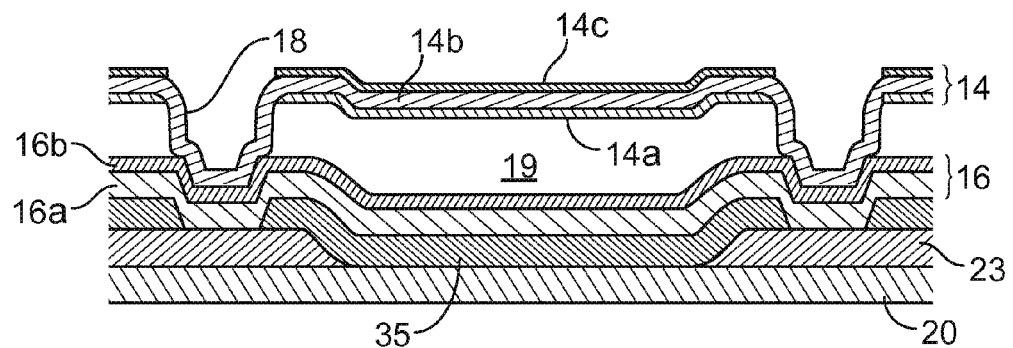

FIG. 5E shows another example of an IMOD, where the movable reflective layer 14 is self supporting. In contrast with FIG. 5D, the implementation of FIG. 5E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 5E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 5A-5E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 5C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 5A-5E can simplify processing, such as, e.g., patterning.

Figure 6:
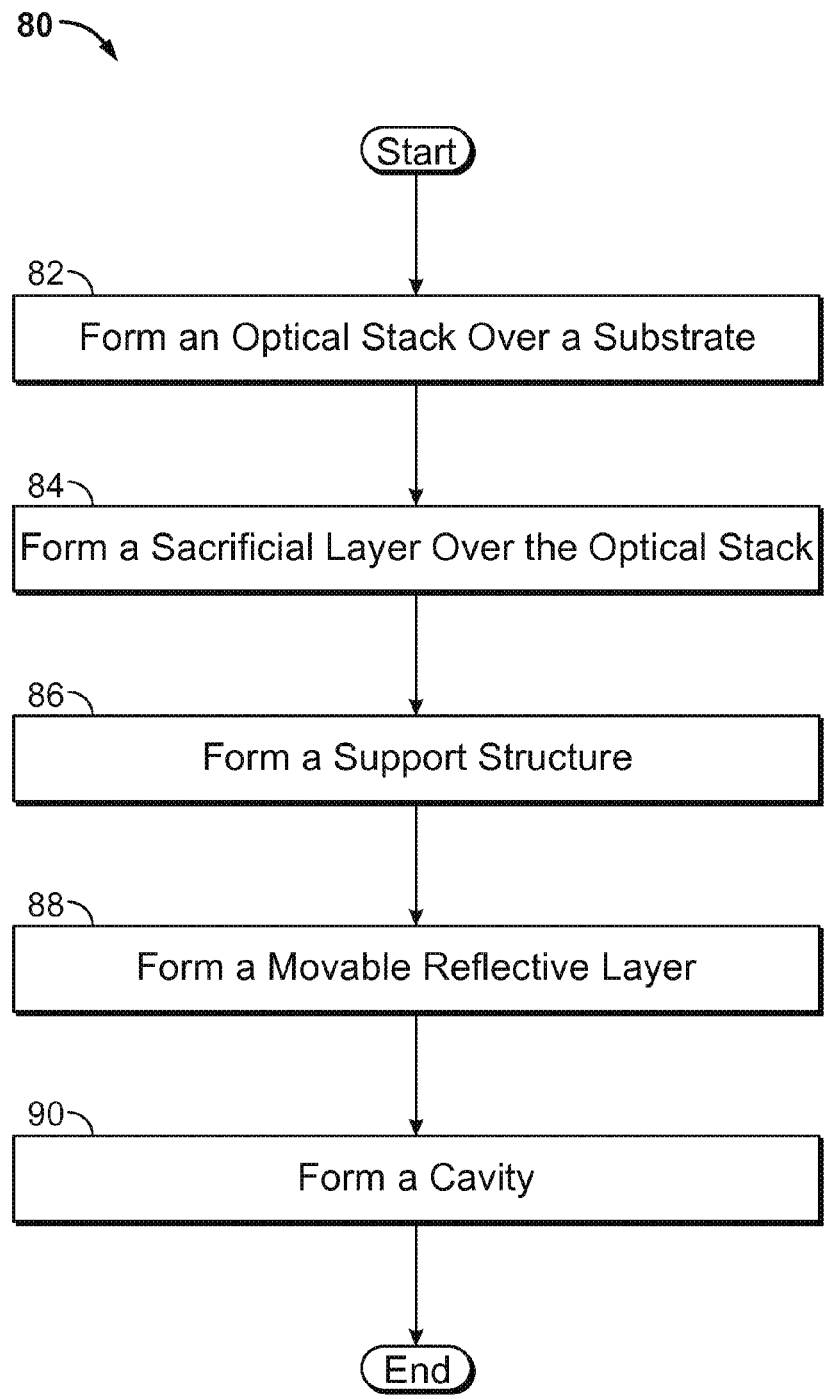
FIG. 6 shows an example of a flow diagram illustrating a manufacturing process for an interferometric modulator.
Figure 7A:
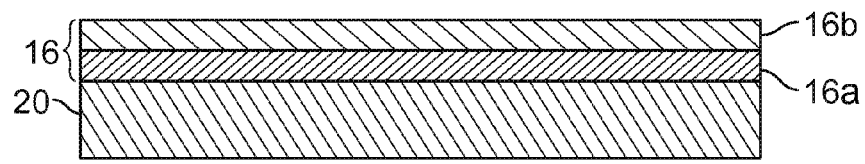
FIGS. 7A-7E show examples of cross-sectional schematic illustrations of various stages in a method of making an interferometric modulator.

FIG. 6 shows an example of a flow diagram illustrating a manufacturing process 80 for an interferometric modulator, and FIGS. 7A-7E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 5, in addition to other blocks not shown in FIG. 6. With reference to FIGS. 1, 5 and 6, the process 80 begins at block 82 with the formation of the optical stack 16 over the substrate 20. FIG. 7A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 7A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 7B:
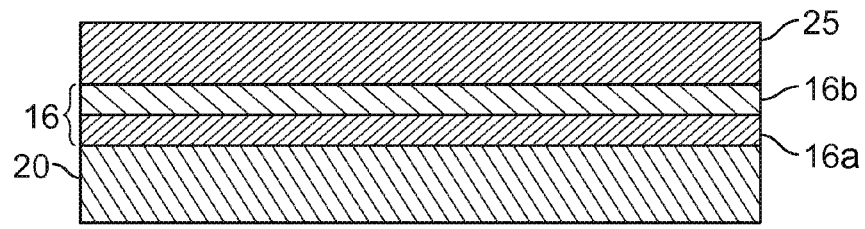

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 7B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIGS. 1 and 7E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 7C:
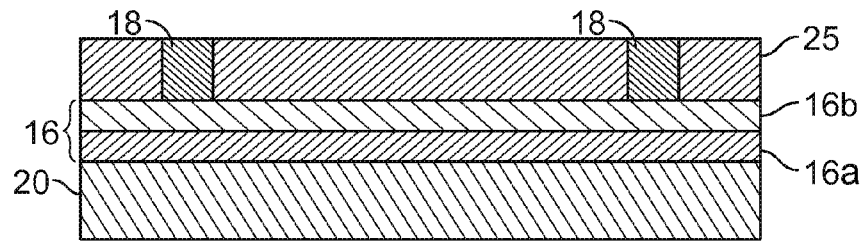

The process 80 continues at block 86 with the formation of a support structure e.g., a post 18 as illustrated in FIGS. 1, 5 and 7C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 5A. Alternatively, as depicted in FIG. 7C, the aperture formed in the sacrificial layer 25 can extend through the sacrificial layer 25, but not through the optical stack 16. For example, FIG. 7E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 7C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 7D:
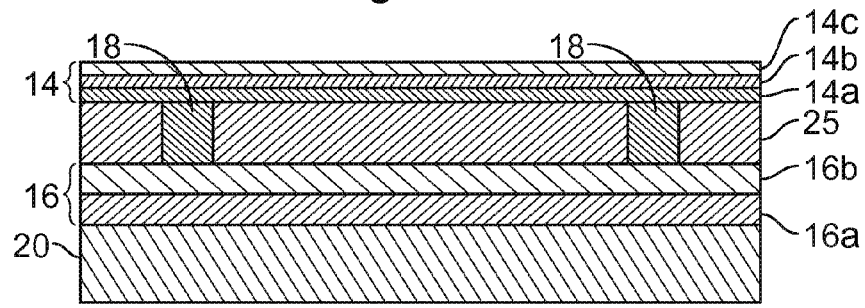
Figure 7E:
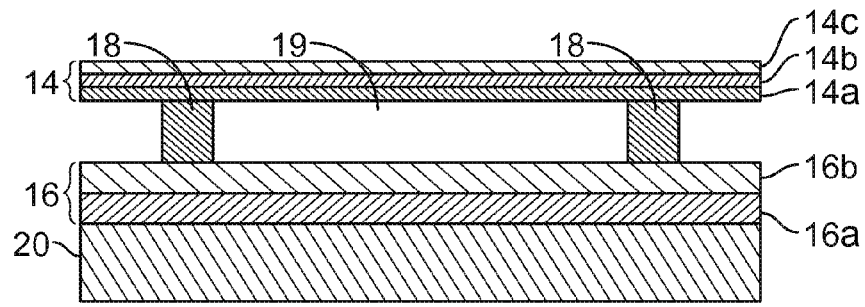

The process 80 continues at block 88 with the formation of a movable reflective layer or membrane such as the movable reflective layer 14 illustrated in FIGS. 1, 5 and 7D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 7D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 5 and 7E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

An electronic device having a display such as those described above may also benefit from an accelerometer. For example, an accelerometer can be used as an input device to allow, e.g., a user to control the electronic device by moving it. An accelerometer also can be used to detect if the device is dropped which may result in an impact to the device. In response to such detection, the device, for example, may automatically save a state of the device, or user documents, or shut down portions of the device.

As mentioned above, an accelerometer generally functions to determine acceleration by detecting the motion of a proof mass. In some implementations, the proof mass is located opposite the viewing surface of the display, and its motion is detected optically. In some implementations, the electronic device also includes a light source and a light detector as part of an optical touch detection system so as to provide touchscreen functionality. The optical touch detection system can include a light source, a light guide which guides the light along the viewing surface of the display, and a light detector to detect whether the light has propagated across the display or been occluded by, e.g., a user's touch. In some implementations, the light source and light detector also can be used to determine the motion of the proof mass.

Figure 8:
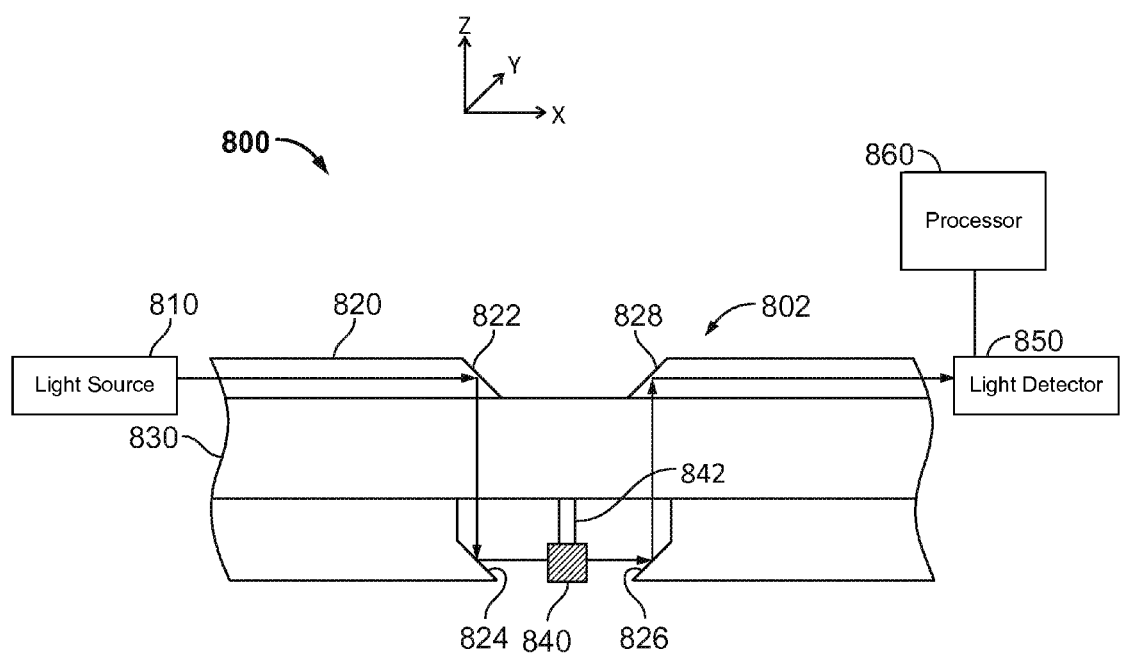
FIGS. 8 and 9A are functional block diagrams of examples of electronic devices illustrating a cross-section of a portion of a display.

FIG. 8 is a functional block diagram of an example of a electronic device illustrating a cross-section of a portion of a display. The electronic device 800 includes a light source 810 which generates light that is guided along the viewing surface of a display 802 by a light guide 820. The light guide 820 includes a first reflecting surface 822 which redirects the light generated by the light source through a substrate 830. On the opposite side of the substrate 830 is a second reflecting surface 824 which redirects the light towards a proof mass 840. The proof mass 840 is connected to the substrate 830 by one or more springs 842. The proof mass 840 can move with respect to the substrate 830 when the electronic device 800 is accelerated.

Unless the light is completely occluded by the proof mass 840, at least a portion of the light continues past the proof mass 840 to a third reflecting surface 826 which redirects the light back through the substrate 830. On the viewing side of the substrate 830, the light guide 820 includes a fourth reflecting surface 828 which redirects the light along the viewing surface of the display 802.

The electronic device 800 includes a light detector 850 which determines a characteristic of the light and a processor 860 which determines an acceleration based on the determined characteristic.

The light source 810 can be any device capable of producing light. In some implementations, the light source 810 includes an LED, such as a multi-colored or phosphor-based white LED. In some other implementations, the light source 810 can include an incandescent light bulb, a cold cathode fluorescent lamp, or a hot cathode fluorescent lamp.

The light guide 820 can be a transparent material, such as glass or plastic. The light guide 820 can be deposited on the viewing surface of the substrate 830, e.g., as a film. The substrate 830 also can be a transparent material, such as glass or plastic. In some implementations, the light guide 820 can be formed by selectively etching portions of the substrate 830. The substrate 830 also can be an opaque material, such as silicon or metal, with through-holes or vias in particular locations which allow light to pass through the substrate 830. The through-holes or vias may be empty or filled with a transparent material.

The proof mass 840 can be attached to the substrate 830 via one or more springs 842. As used herein, a spring is any elastic object which can store mechanical energy. For example, the proof mass 840 may be attached to the substrate 830 via a rubber casing. Alternatively, the proof mass 840 can be attached to the substrate 830 via stiff, yet bendable prongs. The proof mass 840 can even be attached via one or more coil or helical springs. These and other types of springs can experience and respond differently to linear or angular acceleration. For example, stiff, bendable prongs may act as both compression and torsional springs.

When the electronic device 800 is moved or otherwise subjected to acceleration, the proof mass 840 moves with respect to the substrate 830. The proof mass 840 can alter a characteristic of the light detected by the light detector 850 by interfering with the light emitted by the light source 810 as it propagates from the second reflective surface 824 and third reflective surface 826. For example, the proof mass 840 may alter the light intensity, color, or polarity. This alteration can be detected by the detector 850 based on its determination of a characteristic of light incident upon the detector 850 and converted into acceleration by the processor 860.

For example, the proof mass 840 can alter an intensity of light detected by the detector 850 by reflecting or absorbing a portion of the light emitted by the light source 810. Thus, the detector 850 can detect an intensity of light based on light emitted by the light source 810 in addition to ambient lighting if the proof mass 840 does not interfere with the light emitted by the light source 810 as it propagates from the second reflective surface 824 and third reflective surface 826. If the proof mass were to completely occlude the light emitted by the light source 810 from reaching the detector 850, the detector 850 can detect an intensity of light based only on ambient lighting.

For example, an opaque proof mass 840 can move in and out of the light path between the second reflective surface 824 and third reflective surface 826 depending on the acceleration of the electronic device 800. The detector 850 can determine the intensity of light incident upon the detector 850 and more specifically, can determine whether the intensity of light incident upon the detector 850 is greater than a predetermined threshold. Based on this determination, the processor 860 can determine whether or not the acceleration is above a threshold.

As an example, if the device 800 were subject to acceleration along the z axis, the proof mass 840 would likewise move along the z axis, either into or out of the light path between the second reflective surface 824 and third reflective surface 826 thereby occluding or passing the light emitted from the light source 810 to the light detector 850. In some other implementations, the proof mass 840 can be attached to move in other directions in response to acceleration in those directions.

In some implementations, the proof mass 840 can be substantially opaque except for a slit through which light passes only when the electronic device 800 is not subject to a threshold amount of acceleration in a particular direction. In some other implementations, the proof mass 840 is substantially opaque except for a pinhole through which light passes only when the electronic device is not subject to a threshold amount of acceleration in either of two particular directions. The pinhole may be oblong such that the threshold amount of acceleration is different in the two particular directions. As an example, the pinhole may be a channel in the x direction and be a different height in the z direction than width in the y direction.

In some implementations, the proof mass 840 remains in the light path between the second reflective surface 824 and third reflective surface 826, but interferes with the light path in such a way that the characteristic of light incident upon the detector 850 changes depending on the relative position of the proof mass 840 with respect to the substrate 830. In some implementations, the opacity of the proof mass 840 is a radial gradient from transmissive at the center to substantially opaque at the edges such that when the proof mass 840 moves with respect to the substrate 830, the intensity of the light incident upon the detector 850 is diminished. In some other implementations, the proof mass 840 can refract light into a rainbow of colors, such that at different accelerations, different wavelengths of light are passed towards the detector 850. Alternatively, the proof mass 840 can be a polarizer which polarizes the light in different directions at different accelerations.

Many display devices can incorporate a supplemental source of illumination. For example, LCD displays can include a backlight and interferometric modulator displays can include a front light. As described above, FIG. 8 illustrates a display device 800 with a transparent substrate 830 having a proof mass 840 attached to the substrate 830 via one or more springs 842 and having a light guide, or film 820 deposited thereon to deflect light through the substrate 830. One or more of the substrate 830, proof mass 840, springs 842, and film 820 can be manufactured via semiconductor manufacturing techniques along with other structures for the device 800, such as driving electronics, temperature sensors, and other components not illustrated in FIG. 8. The display device 800 also can include one or more light sources 810 and light detectors 850. In some implementations, the light sources 810 and light detectors 850 can be used as part of a touch input system and may additionally be used as part of the accelerometer, as described above. Thus, the structure performing the function of the accelerometer can be found in the device or can be manufactured.

Accordingly, a method of manufacturing a device, such as the device 800 of FIG. 8 can include providing a substrate 830, positioning a light source 810 and a light detector 850 proximal to the substrate 830, depositing or etching a light guide 820 onto a first side of the substrate, wherein the light guide 820 is configured to redirect light from the light source 810 through the substrate 830, forming a proof mass 840 attached to a second side of the substrate 830 via one or more springs 842, wherein the second side is opposite the first side and wherein motion of the proof mass 840 alters a characteristic of the light from the light source 810 reaching the light detector 850, and configuring a processor 860 to determine an acceleration based on the characteristic of the light reaching the light detector 850.

In some implementations, positioning the light source 810 includes positioning the light source 810 to inject light into the light guide 820 and/or provide light beams parallel to the substrate 830. Positioning the light detector 850 can include positioning the light detector 850 to receive light from the light guide 820.

In some implementations, forming the proof mass 840 attached to the second side of the substrate 830 via one or more springs 842 also can include forming the springs 842. Alternatively, forming the proof mass 840 attached to the second side of the substrate 830 can include attaching a preformed proof mass 840 to the substrate 830 via one or more springs 842. Forming the proof mass 840 attached to the second side of the substrate 830 can include deposition, etching, lithography, or other micromachining processes.

In some implementations, configuring the processor 860 can include loading a program into processor memory, or attaching a memory to the processor 860 encoded with instructions for determining an acceleration based on the characteristic of light.

Figure 9A:
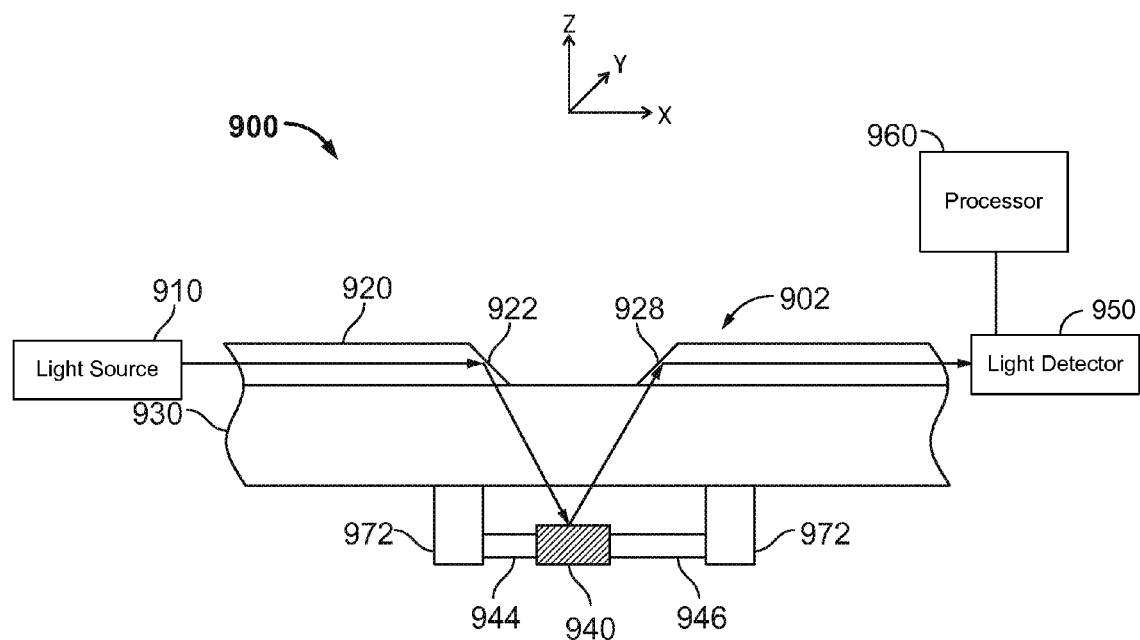

FIG. 9A is a functional block diagram of an example of an electronic device illustrating a cross-section of a portion of a display. The electronic device 900 includes a light source 910 which generates light that is guided along the viewing surface of a display 902 by a light guide 920. The light guide 920 includes a first reflecting surface 922 which redirects the light generated by the light source 910 through a substrate 930. On the opposite side of the substrate 930 is a reflective proof mass 940. The proof mass 940 is connected to the substrate 930 by one or more springs 944, 946. The proof mass 940 can move with respect to the substrate 930 when the electronic device 900 is accelerated.

At some accelerations, the light is reflected by the proof mass 940 back through the substrate 930 towards a second reflecting surface 928 on the viewing side of the substrate 930 which redirects the light though the light guide 920 along the viewing surface of the display 902.

The electronic device 900 includes a light detector 950 which determines a characteristic of the light and a processor 960 which determines an acceleration based on the determined characteristic.

The light source 910 can be any device capable of producing light. In some implementations, the light source 910 includes an LED, such as a multi-colored or phosphor-based white LED. In some other implementations, the light source 910 can include an incandescent light bulb, a cold cathode fluorescent lamp, or a hot cathode fluorescent lamp.

The light guide 920 can be a transparent material, such as glass or plastic. The light guide 920 can be deposited on the viewing surface of the substrate 930, e.g., as a film. The substrate 930 also can be a transparent material, such as glass or plastic. In some implementations, the light guide 920 can be formed by selectively etching portions of the substrate 930. The substrate 930 also can be an opaque material, such as silicon or metal, with through-holes or vias in particular locations which allow light to pass through the substrate 930. The through-holes or vias may be empty or filled with a transparent material.

The proof mass 940 is attached to the substrate 930 via one or more springs 944, 946. The substrate 930 can include two supports 972, one on either side of the proof mass 940, and the proof mass 940 can be attached to the substrate 930 via a first spring 944 attached to a support 972 and a second spring 946 attached to a support 972.

Figure 9B:
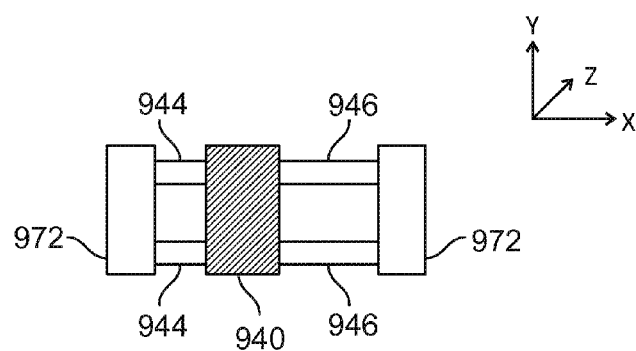
FIG. 9B is an example of a plan view of FIG. 9A.

FIG. 9B is an example of a plan view of FIG. 9A. As shown in FIG. 9B, each of the first spring 944 and second spring 946 may include more than one spring.

When the electronic device 900 is moved or otherwise subjected to acceleration, the proof mass 940 moves with respect to the substrate 930. In some implementations, the proof mass 940 is attached the substrate 930 via two springs 944, 946 with different spring constants. Thus, when the electronic device 900 is moved or otherwise subjected to acceleration, the proof mass 940 rotates. In some other implementations, the proof mass 940 is attached to the substrate 930 via a hinge on one side and a spring 946 on the other, such that the proof mass 940 rotates when the electronic device 900 is accelerated.

As an example, if the device 900 were subject to acceleration along the z axis, the proof mass 940 would rotate about the y axis, thereby either reflecting light back through the substrate 930 towards or away from the second reflecting surface 928. At some accelerations, for example zero acceleration, the proof mass 940 is angled to reflect light back through the substrate 930 towards the second reflecting surface 928 on the viewing side of the substrate 930 which redirects the light though the light guide 920 along the viewing surface of the display 902 towards the detector 950. At some other accelerations, the proof mass 940 is angled to reflect light away from the second reflecting surface 928 and thus not redirecting light through the light guide 920 towards the detector 950. The detector 950 can determine whether light is reaching the detector 950, and more specifically, the detector 950 can determine whether the intensity of light incident upon the detector 950 is greater than a predetermined threshold. Based on this determination, the processor 960 can determine whether or not the acceleration is above a threshold.

In some implementations, the proof mass 940 can reflect light back through the substrate 930 towards the second reflecting surface 928 at a wide range of angles, but in such a way that the characteristic of light incident upon the detector 950 changes depending on the angle of the proof mass 940. The reflective proof mass 940 can be curved such that at different angles, a different amount of light reaches the second reflective surface 928 and the intensity of the light at the detector 950 depends on the acceleration of the electronic device 900. In some implementations, the reflective proof mass 940 reflects a different wavelength of light at different angles, such that at different accelerations, different wavelengths of light are passed towards the detector 950. The proof mass 940 also can reflect light with different polarization directions at different angles.

When the electronic device 900 is moved or otherwise subjected to acceleration, the proof mass 940 can rotate and reflect light having different characteristics depending on its angle. For example, the proof mass 940 may reflect light of different intensity, color, or polarity. This characteristic can be detected by the detector 950 and converted into acceleration by the processor 960.

Figure 10:
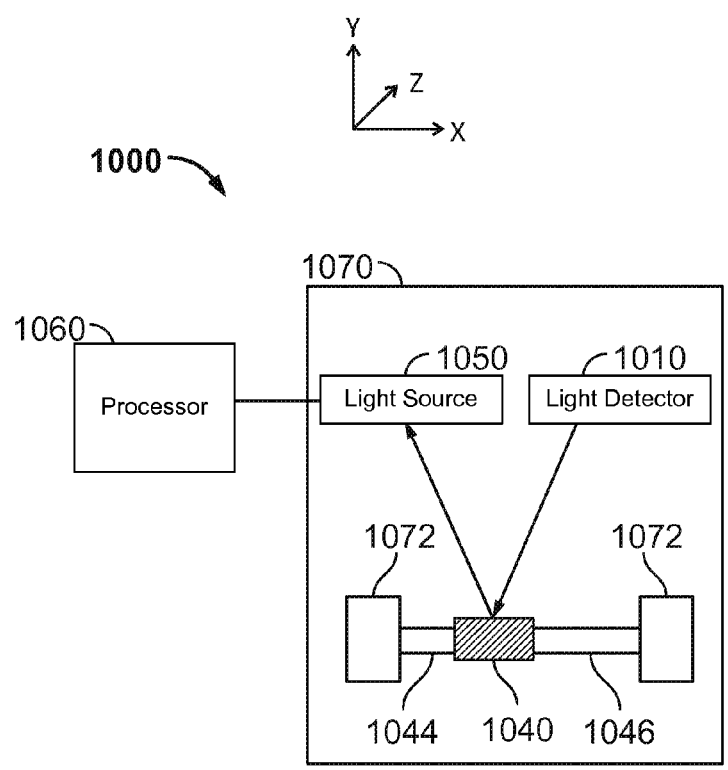
FIGS. 10 and 11 are functional block diagrams of examples of electronic devices illustrating a plan view of an accelerometer.

FIG. 10 is a functional block diagram of an example of an electronic device illustrating a plan view of an accelerometer. The electronic device 1000 includes a substrate 1070 or support upon which at least some of the components can be formed. The electronic device 1000 includes a light source 1010 which generates light that is guided along the substrate 1070 towards a reflective proof mass 1040. The proof mass 1040 is connected to the substrate 1070 by one or more springs 1044, 1046. Thus, the proof mass 1040 moves with respect to the substrate 1070 when the electronic device 1000 is accelerated. In some implementations, the electronic device 1000 components can be formed and found outside the substrate 1070.

At some accelerations, the light is reflected by the proof mass 1040 back along the substrate 1070 towards a light detector 1050 which determines a characteristic of the light. The light detector 1050 can be operatively coupled to a processor 1060 which determines an acceleration based on the determined characteristic.

The proof mass 1040 can be attached to the substrate 1070 via springs 1044, 1046 which are attached to the substrate 1070 via supports 1072, one on either side of the proof mass 1040. Each of the first spring 1044 and second spring 1046 may include more than one spring.

When the electronic device 1000 is moved or otherwise subjected to acceleration, the proof mass 1040 can move with respect to the substrate 1070, the light source 1010, and/or the light detector 1050. In some implementations, the proof mass 1040 can be attached the substrate 1070 via two springs 1044, 1046 with different spring constants. Thus, when the electronic device 1000 is moved or otherwise subjected to acceleration, the proof mass 1040 rotates. In some other implementations, the proof mass 1040 can be attached to the substrate 1070 via a hinge on one side and a spring 1046 on the other, such that the proof mass 1040 rotates when the electronic device 1000 is accelerated.

As an example, if the device 1000 were subject to acceleration along the y axis, the proof mass 1040 would rotate about the z axis, thereby either reflecting light towards or away from the light detector 1050. At some accelerations, for example zero acceleration, the proof mass can be angled to reflect light back towards the detector 1050. At some other accelerations, the proof mass 1040 can be angled to reflect light away from the detector 1050. The detector 1050 can be implemented to determine whether light is reaching the detector 1050, and more specifically, the detector 1050 can be implemented to determine whether the intensity of light incident upon the detector 1050 is greater than a predetermined threshold. Based on this determination, the processor 1060 can be implemented to determine whether or not the acceleration is above a threshold.

In some implementations, the proof mass 1040 can reflect light back along the substrate 1070 towards the light detector 1050 at a wide range of angles in such a way that the characteristic of light incident upon the detector 1050 changes depending on the angle of the proof mass 1040. The reflective proof mass 1040 can be curved such that at different angles, a different amount of light reaches the detector 1050 and, accordingly, the intensity of the light at the detector 1050 depends on the acceleration of the electronic device 1000. In some implementations, the reflective proof mass 1040 reflects a different wavelength of light at different angles, such that at different accelerations, different wavelengths of light are passed towards the detector 1050. The proof mass 1040 also can reflect light with different polarization directions at different angles.

When the electronic device 1000 is moved or otherwise subjected to acceleration, the proof mass 1040 can rotate and reflect light having different characteristics depending on its angle. For example, the proof mass 1040 may reflect light of different intensity, color, or polarity. This characteristic can be detected by the detector 1050 and converted into acceleration by the processor 1060.

Figure 11:
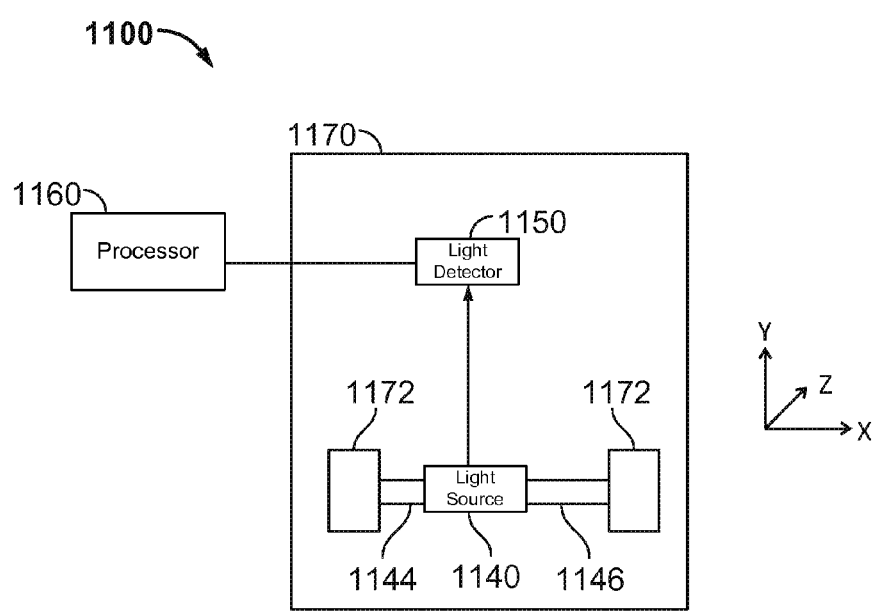

FIG. 11 is a functional block diagram of an example of an electronic device illustrating a plan view of an accelerometer. Whereas the electronic device 1000 of FIG. 10 includes a light source 1010 and a reflective proof mass 1040, the electronic device 1100 of FIG. 11 includes a light source 1140 which functions as the proof mass.

The light source 1140 can be attached to the substrate 1170 via one or more springs 1144, 1146 and one or more supports 1172. In some implementations, at least two of the springs 1144, 1146 have different spring constants such that the light source 1140 rotates when the electronic device 1100 is moved or otherwise subjected to acceleration. As an example, if the device 1100 were subject to acceleration along the y axis, the proof mass 1150 would rotate about the z axis. The light source 1140 can be configured to emit light with different characteristics at different angles. Thus, when the characteristic of light is determined by the light detector 1150, the processor 1160 can be implemented to determine an angle of the light source 1140 or an acceleration as described above.

Figure 12:
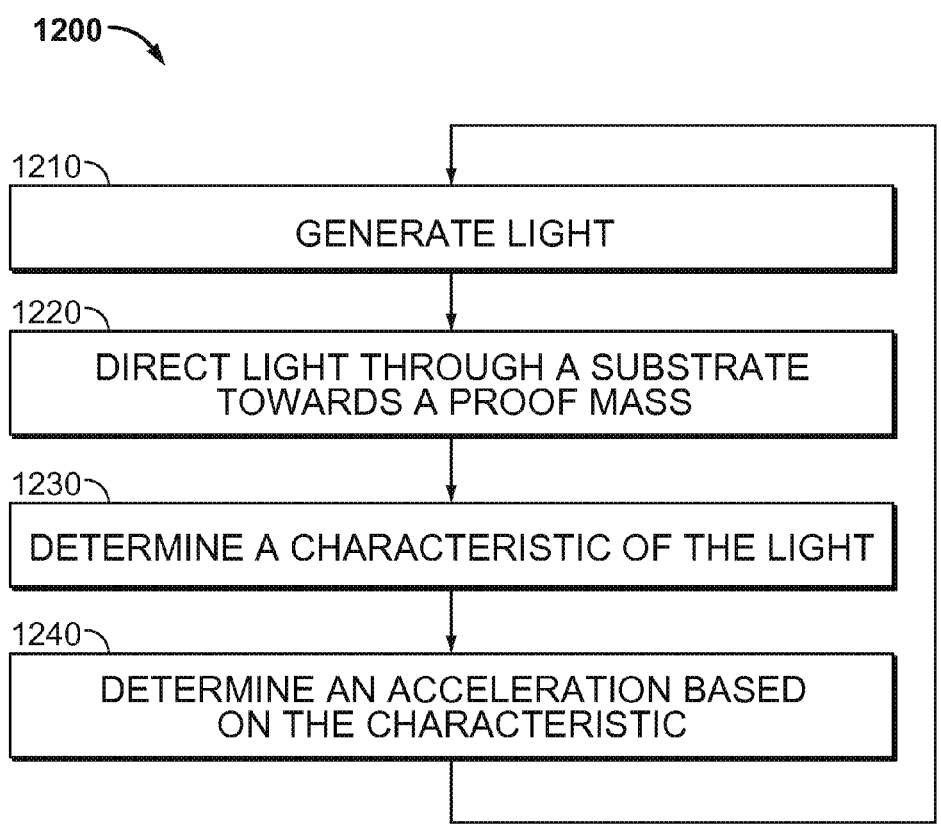
FIG. 12 is an example of a flowchart illustrating a method of determining an acceleration.

FIG. 12 is an example of a flowchart illustrating a method of determining an acceleration. Such a method 1200 can be performed, for example, by an electronic device including a display such as those described above. The method 1200 begins, in block 1210, with the generation of light. In some implementations, light is generated from a light source, such as an LED. In block 1220 the light generated from the light source is redirected through a substrate to a proof mass. The light can be redirected by a reflective surface of a light guide. In an alternative implementation of the method 1200, the light is not generated, but repurposed from an external source such as the sun or ambient lighting.

Next, in block 1230, a characteristic of the light is determined. In some implementations, the characteristic of light is determined by a detector. The characteristic of light can be altered by a proof mass prior to the determination. The alteration can be dependent on an acceleration. The characteristic of light can be, for example, an intensity, color, or polarity. Related to intensity, in some implementations, the characteristic of light is a beam width.

Continuing to block 1240, an acceleration is determined based at least in part on the determined characteristic. In some implementations, the determined acceleration is a value. For example, the acceleration can be determined (and stored in a memory) in g-force units (gs) or in m/s². In some other implementation, the determined acceleration is an indication of the presence of at least a predetermined threshold acceleration in a particular direction. Thus, the acceleration can be stored in a memory as a one-bit flag which is '1' in the presence of the acceleration and a '0' when the acceleration is not present. In some implementations, a processor can determine an acceleration according to a formula for which the detected light characteristic is an input. The processor also can determine an acceleration according to a look-up table stored in a memory which correlates particular light characteristics with particular accelerations. In addition, the processor can determine an acceleration when the light characteristic crosses a predetermined threshold. The determined acceleration may be linear or angular, or include multiple accelerations including linear and/or angular components.

Figure 13:
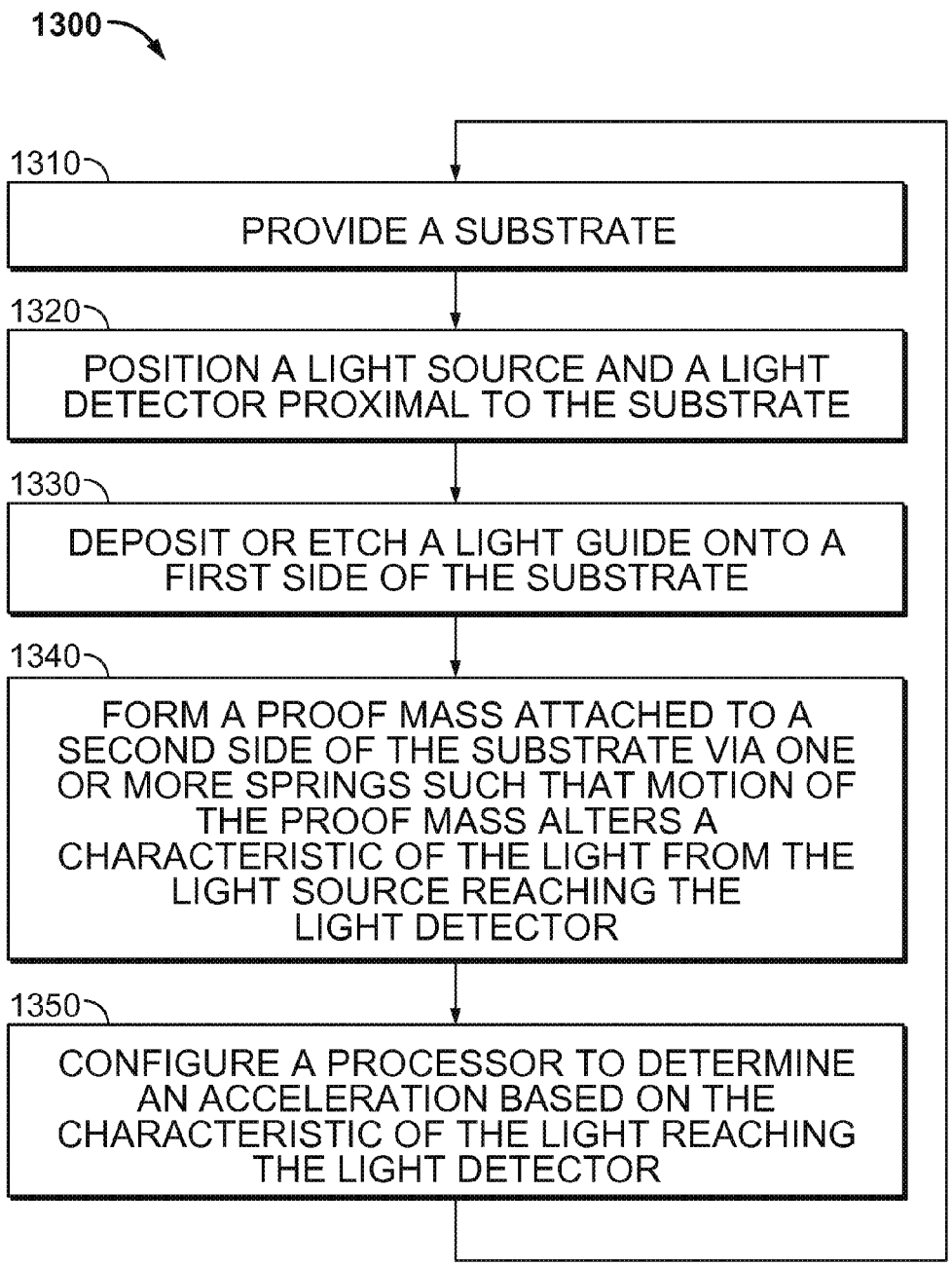
FIG. 13 is an example of a flowchart illustrating a method of manufacturing a display device.

FIG. 13 is an example of a flowchart illustrating a method of manufacturing a display device. Such a method 1300 can be performed, for example, by a manufacturing device. The method 1300 begins, in block 1310, with the provision of a substrate. The substrate can be a transparent material, such as glass or plastic. The substrate also can be an opaque material, such as silicon or metal, with through-holes or vias in particular locations which allow light to pass through the substrate. The through-holes or vias may be empty or filled with a transparent material.

Next, in block 1320, a light source and a light detector are positioned proximal to the substrate. Next, block 1330, a light guide is either etched into or deposited onto a first side of the substrate such that the light guide is configured to redirected light from the light source through the substrate. The light source can be any device capable of producing light. In some implementations, the light source includes an LED, such as a multi-colored or phosphor-based white LED. In some other implementations, the light source can include an incandescent light bulb, a cold cathode fluorescent lamp, or a hot cathode fluorescent lamp. The light guide can be a transparent material, such as glass or plastic. The light guide can be deposited on the viewing surface of the substrate, e.g., as a film. In some implementations, the light guide can be formed by selectively etching portions of the substrate.

Continuing to block 1340, a proof mass is formed attached to a second side of the substrate via one or more springs, wherein the second side is opposite the first side. Motion of the proof mass can alter a characteristic of the light from the light source reaching the light detector. Thus, a characteristic of the light detected by the detector, potentially including light emitted by the light source, can be altered motion of the proof mass. The characteristic of light the detector is configured to determine, or which the proof mass is configured to alter, can be an intensity, a polarization, or a wavelength.

Next, in block 1350, a processor is configured to determine an acceleration based on the characteristic of the light reaching the light detector. In some implementations, a processor can determine an acceleration according to a formula for which the detected light characteristic is an input. The processor also can determine an acceleration according to a look-up table stored in a memory which correlates particular light characteristics with particular accelerations.

Figure 14A:
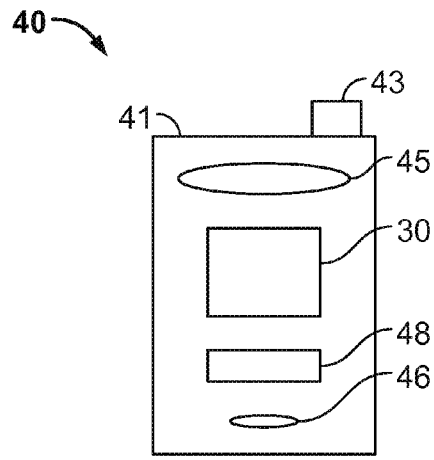
FIGS. 14A and 14B show examples of system block diagrams illustrating a display device that includes a plurality of interferometric modulators.
Figure 14B:
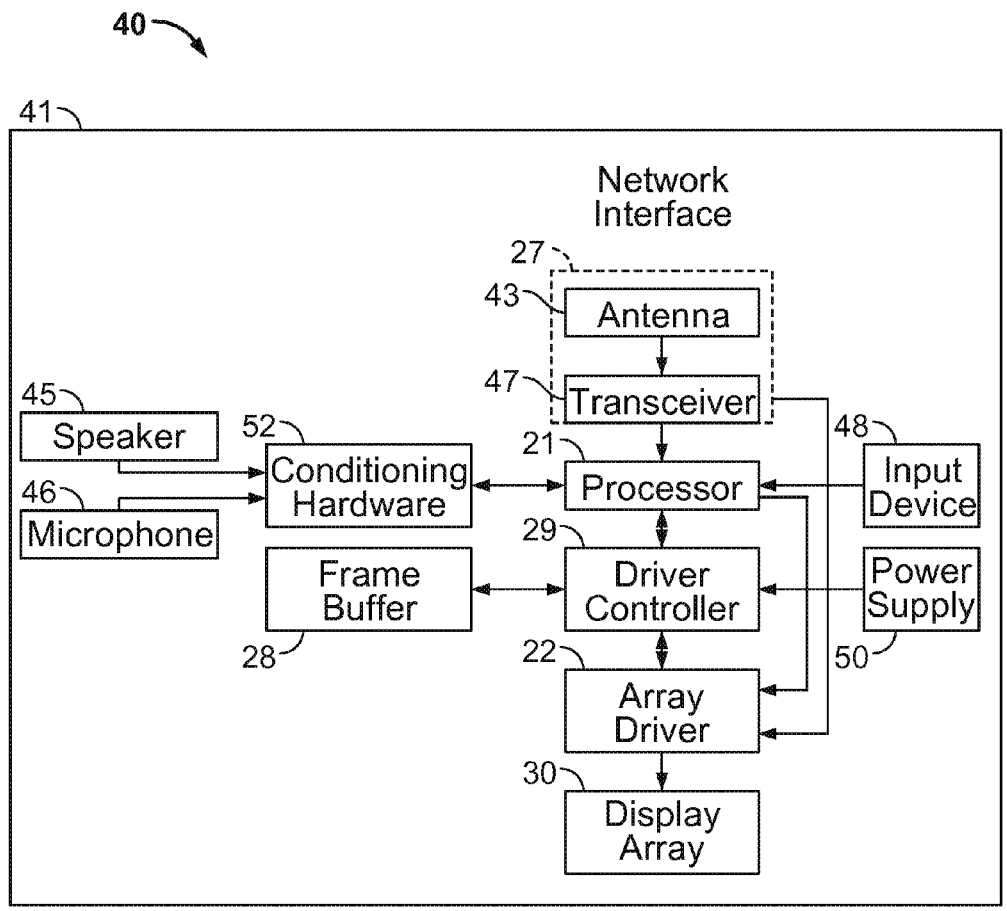

FIGS. 14A and 14B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 14B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), NEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus. If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An accelerometer, comprising:
    a light source configured to emit a light;
    a substrate;
    a light guide attached to a first side of the substrate and configured to redirect the light emitted from the light source through the substrate;
    a light detector configured to determine a characteristic of light incident on the light detector; and
    a proof mass attached to a second side of the substrate via one or more springs, wherein the second side is opposite the first side and wherein the proof mass is positioned outside of a light path of the light, but wherein motion of the proof mass is configured to move the proof mass into the light path and to at least partially occlude the light emitted from the light source and thereby alter the characteristic of the light determined by the light detector, wherein the characteristic of the light includes at least one of an intensity of the light, a polarization, and a wavelength.

2. The accelerometer of claim 1, further comprising a processor configured to determine an acceleration based on the determined characteristic.

3. The accelerometer of claim 1, further comprising a backside light guide deposited on the substrate opposite the light guide and configured to redirect light back through the substrate.

4. The accelerometer of claim 1, wherein the light source comprises at least one of a light-emitting diode, an incandescent light bulb, a cold cathode fluorescent lamp, and a hot cathode fluorescent lamp.

5. The accelerometer of claim 1, wherein the light guide comprises an etched portion of the substrate.

6. The accelerometer of claim 1, wherein the substrate is at least partially transparent.

7. The accelerometer of claim 1, wherein the light is redirected through transparent vias of the substrate.

8. The accelerometer of claim 1, wherein the proof mass is at least partially opaque or partially reflective.

9. The accelerometer of claim 1, wherein the one or more springs comprise two springs with different spring constants.

10. The accelerometer of claim 1, wherein the substrate comprises glass.

11. A method of determining an acceleration, comprising:
    directing a light through a substrate towards a proof mass positioned outside of a light path of the light, a motion of the proof mass configured to move the proof mass into the light path and to at least partially occlude the light; and
    determining an acceleration based on a characteristic of the light, wherein the characteristic of the light includes at least one of an intensity of the light, a polarization, and a wavelength.

12. The method of claim 11, further comprising redirecting the light back through the substrate.

13. The method of claim 11, wherein directing a light through a substrate comprises directing a light, using a light guide formed by selectively etching portions of a substrate, through the substrate.

14. The method of claim 11, wherein motion of the proof mass alters the characteristic of the light.

15. The method of claim 11, further comprising generating the light.

16. The method of claim 11, further comprising determining the characteristic of the light.

17. An accelerometer, comprising:
- means for directing a light through a substrate towards a proof mass positioned outside of a light path of the light, a motion of the proof mass configured to move the proof mass into the light path and to at least partially occlude the light; and
- means for determining an acceleration based on a characteristic of the light, wherein the characteristic of the light includes at least one of an intensity of the light, a polarization, and a wavelength.

18. The accelerometer of claim 17, further comprising means for generating a light and means for determining a characteristic of the light.

19. The accelerometer of claim 18, wherein the means for generating the light comprises a light source, wherein the means for directing the light comprises a light guide, wherein the means for determining the characteristic comprises a light detector, and wherein the means for determining an acceleration comprises a processor.

20. An accelerometer, comprising:
- an optical element attached to a support via at least two springs with different spring constants positioned outside of a light path of a light and a motion of the optical element configured to move the proof mass into the light path and to at least partially occlude the light; and
- a light detector configured to determine an intensity of the light.

21. The accelerometer of claim 20, further comprising a processor configured to determine an acceleration based on the determined intensity.

22. The accelerometer of claim 20, wherein the at least two springs comprises at least two springs with different spring constants attached to opposite sides of the optical element.

23. The accelerometer of claim 20, wherein the optical element is at least partially opaque or partially reflective.

* * * * *